United States Patent [19]

Coggin, Jr. et al.

[11] 4,229,198

[45] Oct. 21, 1980

[54] APPARATUS FOR DRAWING OF GLASS FIBER

[75] Inventors: Charles H. Coggin, Jr., Upland; John L. Jones, Jr., Baldwin Park, both of Calif.

[73] Assignee: Nitto Boseki Co., Ltd., Tokyo, Japan

[21] Appl. No.: 6,382

[22] Filed: Jan. 25, 1979

Related U.S. Application Data

[62] Division of Ser. No. 865,961, Dec. 30, 1977, Pat. No. 4,149,865.

[51] Int. Cl.² .............................................. C03B 37/02
[52] U.S. Cl. ...................................... 65/11 W; 65/29; 65/160; 242/36
[58] Field of Search ..................... 65/2, 11 W, 29, 160; 242/36, 37, 35.5 R, 35.5 A, 35.6 R, 57, 18 G; 57/261

[56] References Cited

U.S. PATENT DOCUMENTS

| | | | |
|---|---|---|---|
| 3,498,039 | 3/1970 | Kent et al. | 57/261 X |
| 3,514,615 | 5/1970 | Noiles et al. | 242/36 X |
| 3,638,412 | 2/1972 | Rebsamen | 57/52 |
| 3,844,497 | 10/1974 | Harrill et al. | 65/11 W X |
| 4,130,406 | 12/1978 | Kawaguchi et al. | 65/2 |

*Primary Examiner*—Robert L. Lindsay, Jr.
*Attorney, Agent, or Firm*—Naylor, Neal & Uilkema

[57] ABSTRACT

An apparatus and method for use with a bushing assembly of the type wherein glass fibers are drawn through an orifice plate having a flat undersurface against which bulk gas is directed to effect cooling and fiber attenuation. A selectively adjustable bulk gas nozzle has a plurality of discharge conduits with valves therein which are adjustable and capable of being selectively operated to close the conduits or return the conduits to a preset open condition. Mounting means supports the nozzle and/or a binder applicator for select movement toward and away from the path of fiber being drawn from the orifice plate. A detector senses the presence of fiber being drawn from the orifice plate and, in the event of fiber break-out, initiates a series of steps to warn the operator of the bushing assembly and, in the event the break-out condition is not corrected, shut down the drawing operation.

3 Claims, 12 Drawing Figures

APPARATUS FOR DRAWING OF GLASS FIBER

RELATED APPLICATION

This is a division of application Ser. No. 865,961 filed Dec. 30, 1977, now U.S. Pat. No. 4,149,865, granted Apr. 17, 1979.

BACKGROUND OF THE INVENTION

The present invention relates to a control system for a bushing assembly used in the drawing of glass fibers and, in particular, is directed to such a system for use with a "bulk gas" drawing assembly of the type disclosed in U.S. Pat. No. 3,905,790 to Edward T. Strickland. In its more specific aspects, the invention is concerned with an improvement in the control system and bulk gas supply nozzle of our U.S. Pat. No. 3,986,853.

The system of our U.S. Pat. No. 3,986,853 relied upon a human operator to (1) sense the occurence of a break-out of the fiber being drawn and (2) activate a control in response to the sensed condition. The activation of the control functioned to lower the temperature of the bushing assembly, increase the rate of flow of bulk gas against the orifice plate of the assembly, and reduce the drawing action of the collet used to draw the fiber from the plate. The system provided a manually operated air lance for startup and clearing of the plate.

SUMMARY OF THE INVENTION

The present invention provides a method and apparatus for the automatic detection of fiber break-out in a glass fiber drawing operation and the initiation of a series of corrective steps in the event of such break-out. Automatic detection is achieved by electronically sensing the presence or absence of the glass fiber being drawn. The sequence of steps initiated in response to the detection includes: an initial alarm; a time delay; and, in the event a human operator does not correct the situation during the time delay period, the automatic initiation of a "break-out mode" of operation. Initiation of the break-out mode lowers bushing temperature, retracts the bulk air supply nozzle and terminates the supply of bulk air, opens a clearing air supply to direct clearing air across and against the orifice plate of the bushing, and shuts off the drawing collet.

The apparatus of the invention also includes an improved nozzle for directing bulk gas against the orifice plate of a bushing used in the drawing of glass fiber. The nozzle is designed to provide for the adjustment of the gas supply to discrete areas of the plate and includes a plurality of outlet conduits, each of which is provided with a valve which may be adjusted to selectively vary the volume of gas passing therethrough, or turned to a full shut-off position. Adjustment of the valves is provided by stops which enable the individual valves to be returned to the adjusted flow position from the shut-off position, without the necessity of readjustment.

The apparatus of the invention also includes a moveable support for the bulk gas supply nozzle to provide for the selective movement of the nozzle toward and away from the path of fibers being drawn from a bushing assembly during the flood clearing step. This support operates in conjunction with the break-out detector to move the bulk gas supply nozzle away from said path in the event the detector senses a break-out. Thus, the nozzle is removed to a position where it does not interfere with clearing operations and wherein it is not subject to fouling by falling glass.

A principal object of the invention is to provide an apparatus and method for the drawing of glass fibers wherein fiber break-out is automatically detected and corrective steps are initiated in response to such detection.

Another object of the invention is to provide such an apparatus and method wherein the corrective steps accomplish shutdown of the drawing operation and wherein alarm and delay steps take place in advance of such corrective steps.

A further object of the invention is to provide a bulk gas supply nozzle for use in a glass fiber drawing assembly wherein the nozzle is selectively adjustable to adjust the flow of gas to discrete areas of the orifice plate of the assembly.

Still another object related to the latter object is to provide such a nozzle wherein the supply of gas to discrete areas of the orifice plate may be selectively shut off or opened during flood clearing and, upon opening, a preadjusted flow condition is established, without need of readjustment.

Yet another object of the invention is to provide a remotely operable mounting means for moveably supporting a bulk gas supply nozzle beneath the orifice plate of a glass fiber drawing assembly.

The foregoing and other objects of the invention will become apparent when viewed in light of the accompanying drawings and following detailed description.

DESCRIPTION OF THE PREFERRED EMBODIMENT

Figures 1, 2:
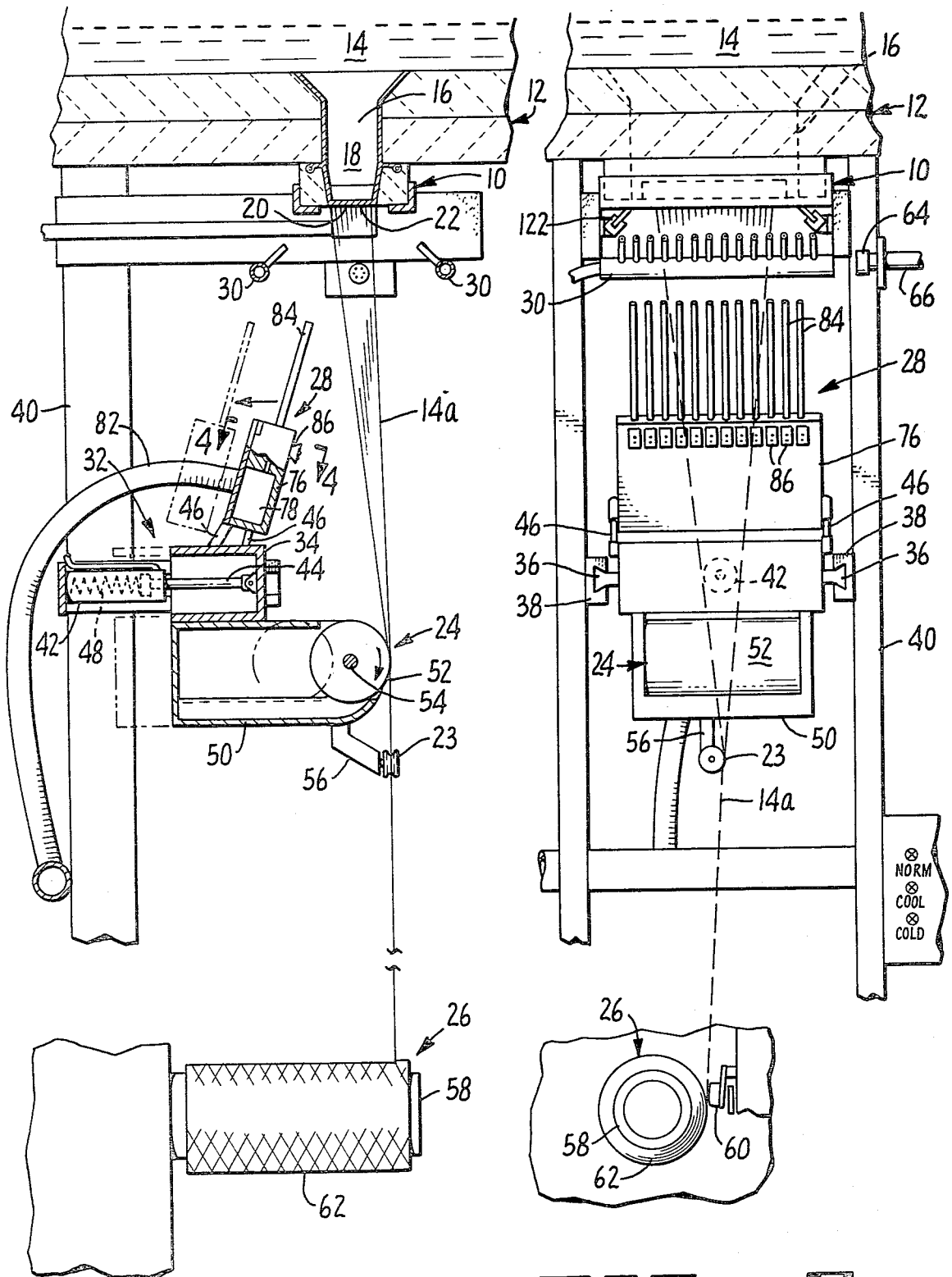
FIG. 1 is an elevational view, with parts thereof broken away and shown in section, illustrating a glass fiber drawing assembly embodying the inventive bulk gas supply nozzle and the moveable support means therefor.
FIG. 2 is a cross-sectional elevational view similar to FIG. 1, taken at 90° from the view of FIG. 1.
Figure 3:
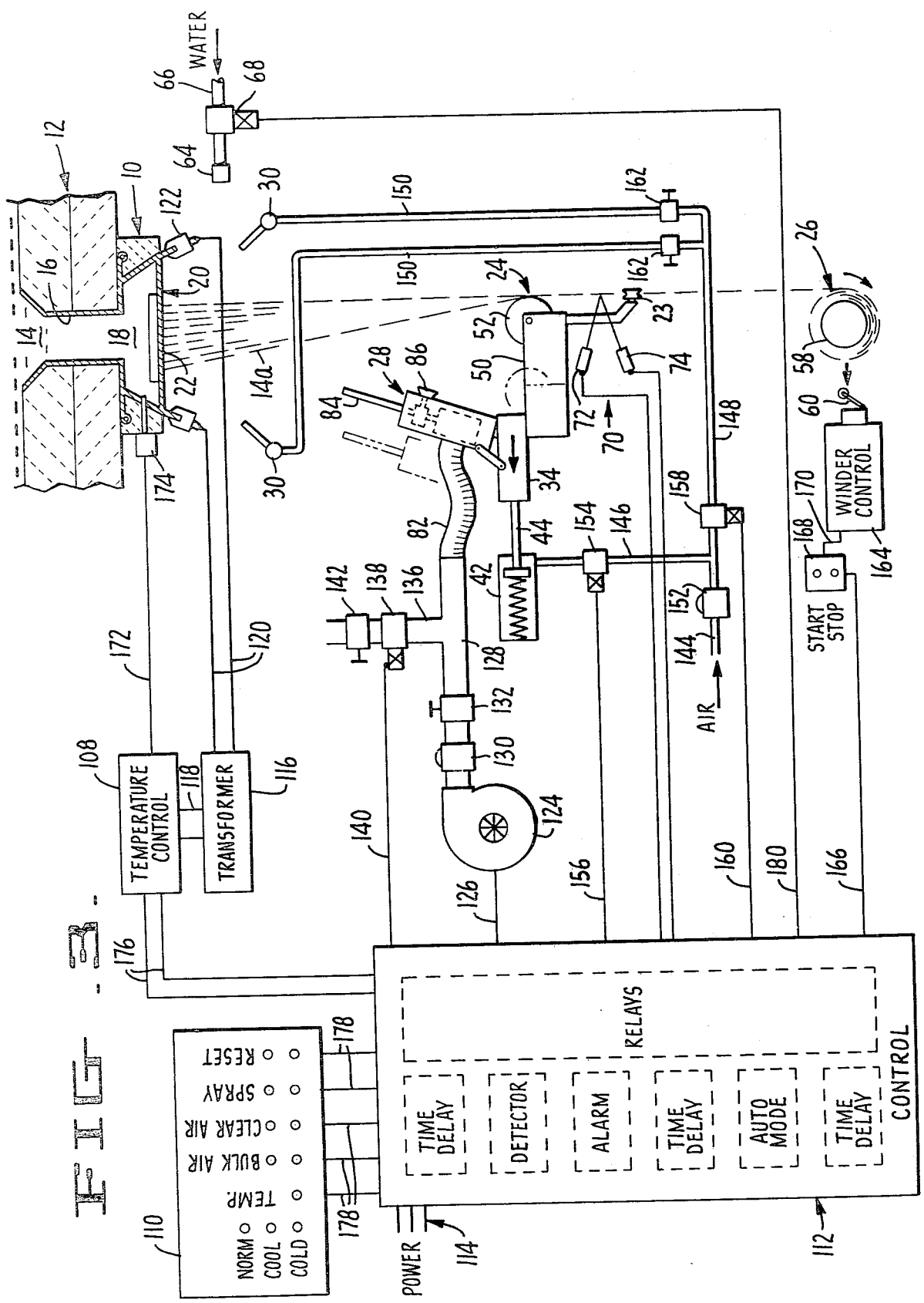
FIG. 3 is a diagrammatic view illustrating the control system of the present invention incorporated into a glass fiber drawing assembly.

Referring now to FIGS. 1, 2 and 3, a bushing assembly designated 10, is shown mounted beneath a flow block 12 which defines the underside of a direct-melt forehearth. The forehearth contains molten glass 14. A flow passage 16 formed in the flow block 12 communicates the glass with a flow chamber 18 formed in the bushing assembly 10. The bottom of the chamber 18 is closed by an orifice plate 20 having a perforated drawing area 22 through which glass fibers, designated 14a, are drawn.

The basic drawing assembly is completed by a gathering shoe 23; a binder applicator assembly 24; a collet winding mechanism 26; a bulk gas supply nozzle 28; and opposed gas supply nozzles 30. The nozzles 30 are of the type disclosed in U.S. Pat. No. 4,033,742 and, in the preferred embodiment, are disposed at an angle of from 30° to 60° degrees to the undersurface of the orifice plate 20. As will become more apparent from the subsequent discussion, the nozzles 30 come into operation when the control system of the present invention is in the automatic break-out mode. These nozzles may also be used for any of the purposes disclosed in U.S. Pat. No. 4,033,742 (e.g., to provide a multiple air lance effect in starting up, clearing, and maintaining a flow of individual glass fibers through the orifices of the orifice plate.

The nozzles 30 are fixedly mounted beneath the orifice plate 20 to either side of the orifice formed therein. As so mounted, the nozzles 30 are outside the path of the fibers 14a and sufficiently removed from the main operating area of the drawing assembly as to not interfere with start-up, clearing or normal drawing operation.

The bulk gas supply nozzle 28 is mounted beneath the bushing assembly 10 on the movable support, designated 32, of the present invention. In addition to the nozzle 28, the support 32 also carries the gathering shoe 23 and the binder applicator 24. The support comprises: a carriage 34; guide elements 36 fixed to either side of the carriage; tracks 38 slideably receiving the guide elements 36, said tracks being fixedly secured to fixed frame members 40; a pneumatic cylinder 42 having its body secured to the frame members 40 and its piston rod 44 secured to the carriage 44; and, brace members 46 securing the nozzle 28 to the carriage 34. In the preferred embodiment, the brace members 46 are selectably adjustable to adjust the angle of the nozzle 28 relative to the carriage. The guide elements 36 and tracks 38 guide the carriage for movement in a rectilinear path toward and away from the path of the fibers 14a being drawn from the bushing assembly 10. Extension of the cylinder 42 on the introduction of air thereinto functions to move the carriage toward the path of the fibers being drawn. Suitable stops (not illustrated) limit the extent of extension so that the nozzle 28 is accurately positioned at the desired position beneath the orifice plate 20 when the carriage is extended. Retraction of the carriage 34 is achieved by releasing the air pressure from the cylinder 46, whereby a spring 48 within the cylinder functions to retract the rod 44.

The gathering shoe 23 and binder applicator 24 are carried by a tray 50 fixedly secured to the carriage 34 for movement therewith. The tray 50 contains a reservoir of binder compound and carries an applicator roll 52 positioned so as to be partially submerged within the compound. The roll 52 is mounted on the tray for free rotation about an axle 54 extending generally normal to the path of the fibers 14a. When the carriage 34 is in the extended condition, fibers 14a engage both the gathering shoe 23 and the roll 52. An arm 56 supports the gathering shoe 23 on the tray 50 so that, when extended, the gathering shoe is aligned with the path of the fibers 14a.

The winder 26 is of the type disclosed in U.S. patent application Ser. No. 735,000, filed on Oct. 22, 1976, by Charles H. Coggin, one of the co-inventors herein. Such a winder is ideally suited for the direct winding of precision packages in that it provides for drawing of the fibers from the gathering shoe at a substantially constant angle. The constant angle is maintained by incrementally moving the collet of the winder away from the guide as the package grows. As shown in FIGS. 1 and 2, the collet and guide of the winder are designated by the numerals 58 and 60, respectively. A package 62 is shown partially formed on the collet. As the package grows, the guide 60 is depressed and this, in turn, triggers the control circuit (not illustrated) of the winder to incrementally move the collet away from the guide.

A water supply nozzle 64 is mounted beneath and to one side of the bushing assembly 10 to selectively spray a fine mist of water against the fibers 14a being drawn from the assembly. Water is supplied to the nozzle by a conduit 66. A solenoid operated valve 68 normally maintains the conduit in a closed condition. As will be seen from the following discussion, the water supply nozzle is open during the start-up operation and closed during the normal operating mode when fibers are being drawn from the bushing.

FIG. 3 illustrates the break-out detector employed to trigger the automatic break-out mode of the inventive control system. This detector is mounted between the applicator roll and the gathering shoe 23 and is focused to detect the presence or absence of a strand of fibers 14a being drawn from the bushing 20 to the collet 58. The detector is designated in its entirety by the numeral 70 and comprises an energy source 72 in the form of a pulsed (i.e., modulated) light emitting diode (LED) and a sensor 74 which is responsive only to the modulated signal of the source. In the preferred embodiment illustrated, the source and sensor are mounted to the same side of the strand being drawn and so focused that the beam from the source impinges upon the strand and bounces back therefrom to the sensor. Thus, so long as the strand is intact, the sensor senses itsdpresence.

The source, sensor, and power supply of the detector may take any suitable commercially available form. It is preferred, however, that this source be of the modulated signal type which generates a high energy beam near the infrared spectrum. One suitable supplier for this equipment has been found to be Opcon, Inc. of Everett, Washington. This company's 1160/1260 Series Detector and 8161B-1X1 Power Supply/Demodulator have proved suitable. The use of a modulated signal in the detector has the advantage that the sensor responds only to the modulated energy beam of the source. This means that extraneous light has no adverse effect on the detector. The bounce-back mounting arrangement employed in the preferred embodiment has the advantage that the detector elements are all to one side of the strand being monitored.

The structure of the bulk gas supply nozzle 28 can best be seen from FIGS. 1, 2 and 4–10. The nozzle comprises: a body 76 having a chamber 78 formed therein; an inlet conduit fitting 80 establishing communication between the interior of chamber 78 and a supply conduit 82 for supplying gas to the nozzle; a plurality of discharge conduits 84 extending through the top of the body 76 into communication with the chamber 78; and, a valve 86 interposed in each of the conduits 84 to selectively control flow therethrough. Each valve 86 comprises; a cylindrical bore 88 formed in the body 76 in intersecting relationship with the conduit 84 associated with the valve; a cylindrical valve core 90 received within the bore for longitudinal and rotational movement relative to the bore, said core having a passage 92 extending transversly therethrough for select alignment and misalignment with the associated conduit 84; a knob 94 fixed to the end of the core 90 externally of the body 76; a compression coil spring 96 interposed between a shoulder 98 formed on the core 90 and an end wall 100 at one end of the bore 88, said spring functioning to normally bias the core toward a position wherein the passage 92 is aligned with the conduit 84 (i.e., to the left as viewed in FIGS. 4, 5 and 8); an adjustable stop screw 102 threadably received in the knob 94 and disposed for a abutting engagement with the body 76 to limit movement of the core 90 in response to the biasing action of the spring 96; a groove 104 formed across one end of the core 90; and, a plate 106 received within the body 76 for slideable receipt in the groove 104 when the axes of the conduit 84 and the passage 92 are in aligned or parallel relationship.

Flow through a valve 86 and its associated conduit 84 can be selectively varied by adjustment of the screw 102 to alter the degree to which the passage 92 of the valve core is aligned with the conduit. A valve 86 may be employed to completely close the conduit 84 associated therewith by pulling the knob 94 to disengage the groove 104 from the plate 106 and then turning the knob so as to engage the end of the core with the plate 106. In order to restore a closed valve 86 to the adjusted flow condition, it is simply necessary to turn the knob 94 to align the groove 104 with the plate 106 and then to release the knob. Release of the knob permits the spring 96 to bring the set screw 102 back into engagement with the body 76.

Figure 4:
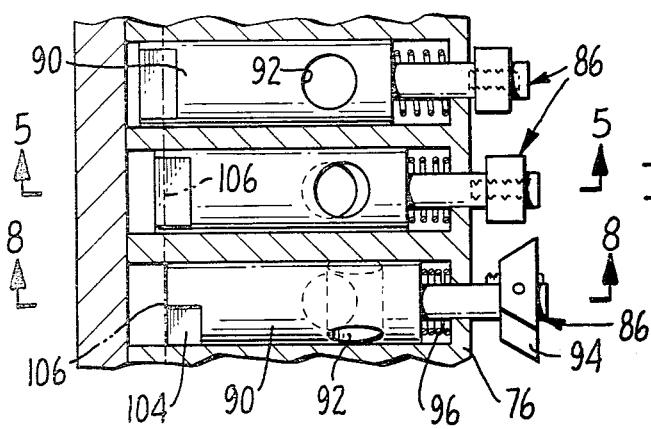
FIG. 4 is a cross-sectional elevational view of the bulk gas supply nozzle of the invention, taken on the plane designated by line 4—4 of FIG. 1.
Figure 5:
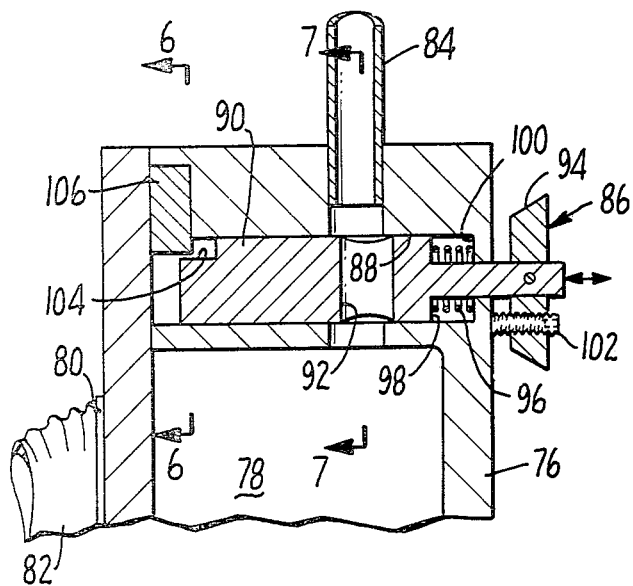
FIG. 5 is a cross-sectional view taken on the plane designated by line 5—5 of FIG. 4, illustrating a valve of the bulk gas supply nozzle in an adjusted restricted flow position.
Figures 6, 7:
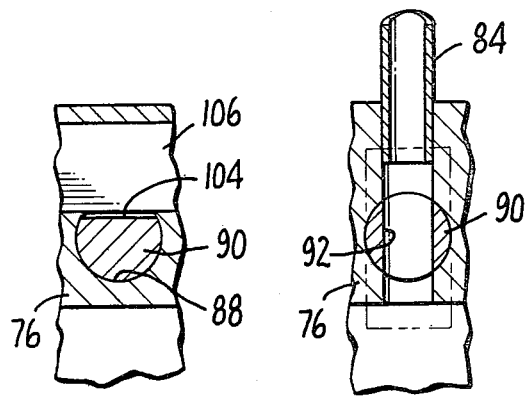
FIGS. 6 and 7 are cross-sectional views taken on the planes designated by lines 6—6 and 7—7 of FIG. 5.
Figure 8:
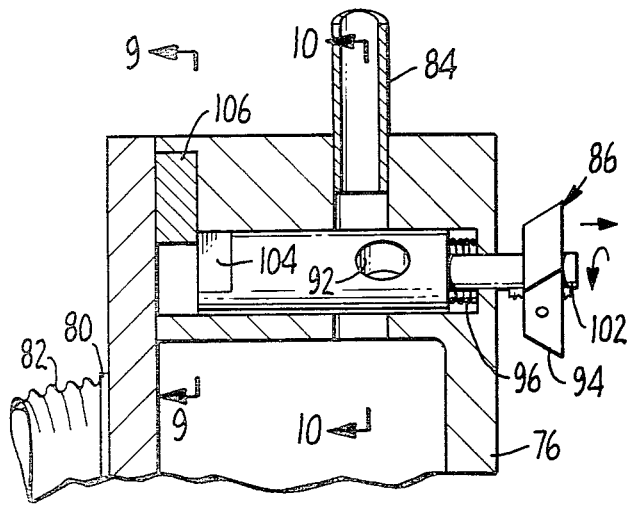
FIG. 8 is a cross-sectional view taken on the plane designated by line 8—8 of FIG. 4, illustrating a valve of the bulk supply nozzle in the shut-off position.
Figures 9, 10:
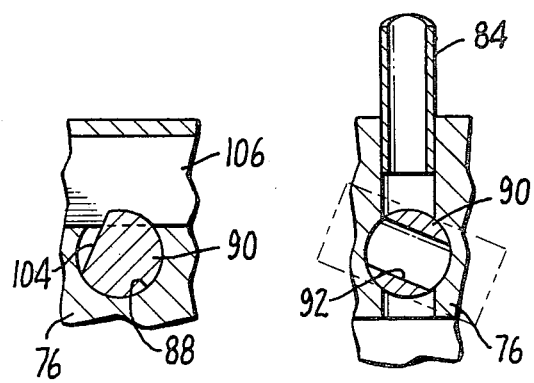
FIGS. 9 and 10 are cross-sectional views taken on the planes designated by line 9—9 and 10—10 of FIG. 8.

As viewed from top to bottom, the three valves in FIG. 4 are in the fully opened, partially restricted, and fully closed positions. FIGS. 5, 6 and 7 illustrate the partially restricted condition in detail. FIGS. 8, 9 and 10 illustrate the fully closed condition in detail.

The overall power supply and control circuitry is diagrammatically illustrated in FIG. 3. The principal elements of the control circuit comprise a temperature control unit 108; an operator control panel 110; and a main control box 112. Power is supplied to the main control box by power leads 114. This power drives the entire system and, through the control circuitry, is selectively employed to energize and control the various elements of the system.

The operational elements of the system comprise; a transformer 116 coupled to the temperature control 108 and having input leads 118 connected to the temperature control 108 and output leads 120 connected to terminals 122 at opposite sides of the orifice plate 20; a blower 24 supplied with power from the main control box 112 by leads 126 and having an output pipe 128 connected to the supply conduit 82 of the bulk gas supply nozzle 28; a pressure regulator 130 interposed in the pipe 128 upstream of a manual control valve 132; a spill pipe 136 interposed in the pipe 128 downstream of the valve 132; a solenoid operated shutoff valve 138 interposed in the spill pipe 136 and having power supply leads 140 connected to the main control box 112; a manually operated flow control valve 142 incorporated into the spill pipe 136 downstream of the valve 138 to selectively restrict the flow through the pipe; a high pressure air supply conduit 144 having one branch 146 leading to the pneumatic cylinder 42 and another branch 148 leading to a pair of conduits 150 connected to the opposed gas supply nozzles 30; pressure regulator 152 within the conduit 144 upstream of the branches 144 and 146; a solenoid operated shutoff and spill valve 154 interposed in the branch 146 and having input leads 156 connected to the main control box 112; a solenoid operated shutoff valve 158 interposed in the branch 148 and having input leads 160 connected to the main control box 112; manually operated flow restrictor valves 162 interposed in the conduit 150 to provide for the selective adjustment of air supplied to the gas supply nozzles 30; a precision control 164 for the winder 26; and, a start-stop switch 168 connected to the control box 112 by leads 166 and to the prescision control 164 by leads 170.

Leads 172 connect the temperature control unit 108 to a thermocouple 174 within the bushing assembly 10. Through the thermocouple connection and the coupling of the temperature control and the transformer 116, the control functions to control resistance heating of the orifice plate 20 to maintain constant the temperature of the glass within the bushing. The control 108 is connected to the main control box 112 by leads 176. These leads together with the circuitry within the main control box provide for the insertion of resistances into the temperature circuitry to selectively vary the temperature of the bushing in response to the command of the operator panel 110.

The operator control panel 110 is connected to the main control box 112 by leads 178. Through these leads, and the manual control switches on the panel, logic circuitry within the control box is selectively activated. In FIG. 3, the legends on the operator control panel 110 identify the function of the various switches and monitoring lights on the panel. The legends on the control box 112 identify, in general terms, the circuitry within the box. As shown, the circuitry is depicted as being an electrical relay system. It is also contemplated that an electronic system could be employed in place of the relay system.

The temperature switch on the control panel 110, through the circuitry within the control box 112, provides for the selective adjustment of temperature to any one of three temperatures, namely, normal, cool and cold. Normal is typically in the range of 2100° to 2300° F. Cool is approximately 40° F. less than normal and cold is approximately 80° F. less than normal. Control is effected by switching parallel resistances into the thermocouple suppression bridge within the control 108 through means of relays within the control box. In the preferred embodiment, the circuitry within the control box requires that the temperature control switch be in the normal position in order for the winder to operate.

The bulk air switch has two positions, namely, "on" and "off". In the on position, the relays within the control box 112 function to energize the blower 124 to supply air to the bulk supply nozzle 28, and to energize the valve 154 to extend the carriage 34. In the off position, the relays within the box 112 de-energize the blower 124 and the valve 154 to terminate the supply of air to the nozzle 28 and to retract the carriage 34. In a multiple bushing facility where the blower 124 is employed to supply bulk gas to a number of bushings, the blower runs continuously and solenoid valves are employed to selectively turn on or off the supply of bulk gas to the respective nozzles.

The clear air switch has two positions, one where the solenoid 158 is energized to open the conduit 148 and the other where the solenoid is permitted to close the conduit. The solenoid 158 is energized through the relays within the box 112.

The spray switch has an "on" position wherein it allows the valve 68 to be automatically controlled by relays within the box 112 and an "off" position wherein it closes the valve. Control of the valve is effected through means of the relays within the box 112 and leads 180 extending from the box to the valve.

The reset switch has two positions. In one, the break-out detector is locked out of the circuit with two of the time delays locked out. The operation of the system with the reset thus positioned is depicted by the logic flow diagram of FIG. 11. In the other position, the reset energizes the full break-out mode of operation, including all time delays and the break-out detector. The operation of the system with the reset in the latter position is depicted by the logic flow diagram of FIG. 12. The functions of the reset switch are achieved through means of the relays within the box 112.

Figures 11, 12:
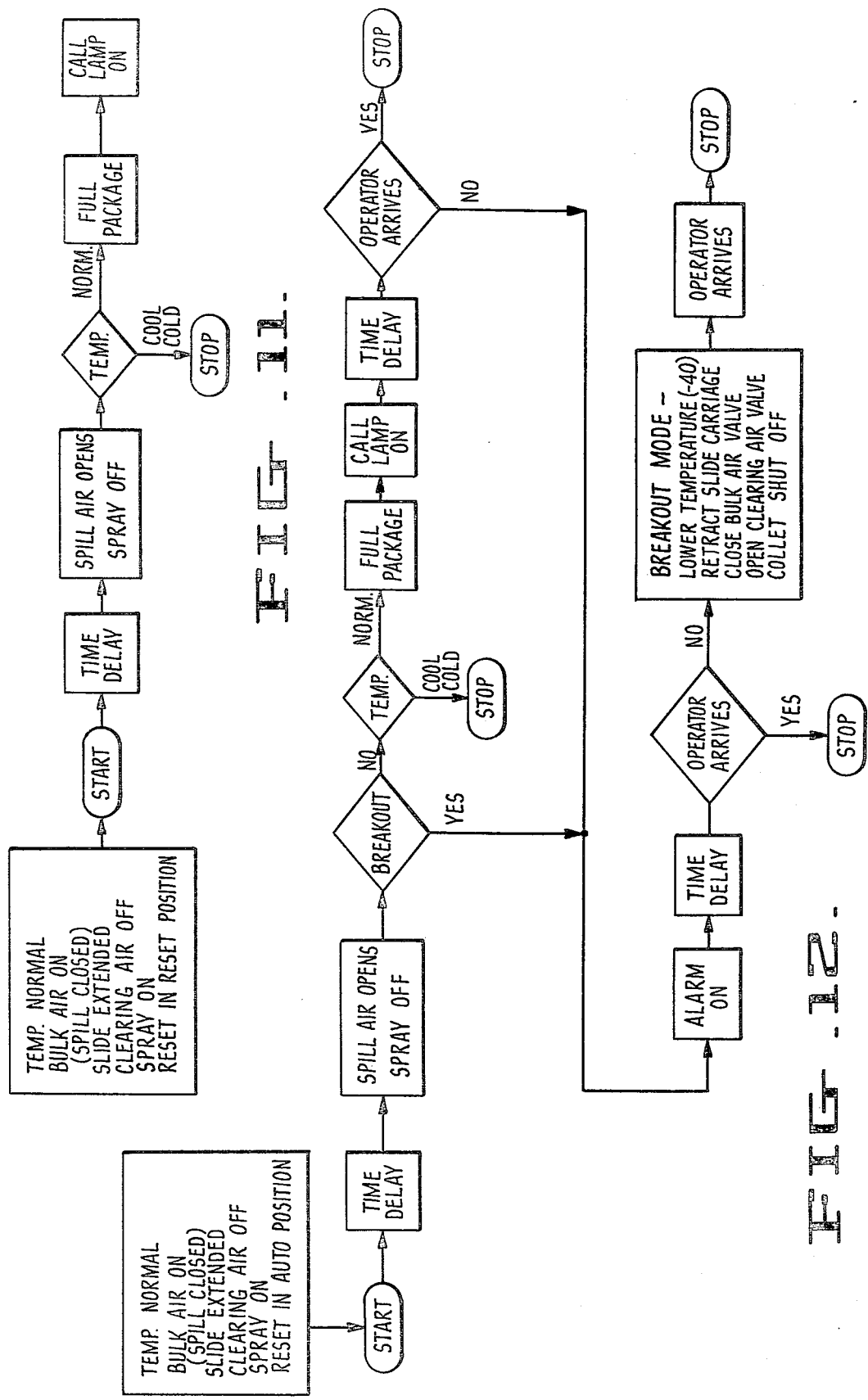
FIG. 11 is a logic flow diagram illustrating the mode of operation of the control system when the automatic break-out control is locked in the inactive (reset) position.
FIG. 12 is a logic flow diagram illustrating the mode of operation of the control system when the automatic break-out control is locked in the active (automatic) position.

The initial boxes in the logic flow diagrams of FIGS. 11 and 12 indicate the positions of the respective switches on the control panel 110 at the commencement of operations. The only difference in these boxes is that in FIG. 11 the reset is in the reset position, while in FIG. 12 the reset is in the auto position.

With the switches on the operator panel positioned as shown in the lead box in FIG. 11, operation of the bushing assembly is initiated by starting the winder. This, in turn, activates the first time delay within the box 112 and, after running of the delay, the relays within the box function to open the spill air valve 138 and close the spray valves 68. At this point, assuming the temperature switch is in the normal condition, the collet proceeds to draw a full package, at the termination of which the winder control energizes a call lamp for the bushing operator. If for any reason the temperature switch is turned to the cool position or the cold position, the collet will stop after the spill air open/spray nozzle off step shown in FIG. 11.

With the reset in the auto position at the commencement of bushing operation, as depicted in FIG. 12, the operation will be the same as that described above with respect to FIG. 11, assuming that no break-out is sensed during operation and that the operator arrives promptly after the call lamp is energized by the operation of the winder controls and the relays within the box 112. If a break-out is detected during operation, or if the operator fails to arrive after a time delay following the call lamp on signal, the system will go to the second line of the logic flow diagram of FIG. 12. As can be seen from this line, the first step that then occurs is that an alarm is activated and this, in turn, is followed by a time delay to give the operator a chance to arrive and stop the bushing operation. If the operator does not arrive, then the system goes to the break-out mode and the following steps automatically take place: the temperature of the bushing is lowered to the cool level (minus 40° F. from normal); the slide carriage 34 is retracted; the bulk air blower 124 is stopped; the clearing air valve 158 is opened; and, the collet is shut off. All of these steps are achieved through means of the logic circuitry and various elements within the control box. The effect of this automatic break-out mode is to shut down the drawing operation, while preventing excessive cooling of the orifice plate which might result in the accumulation of a large ball of hardened glass at the plate. Partial clearing of the flooded plate will slowly occur even in the absence of the operator.

CONCLUSION

From the foregoing description it is believed apparent that the present invention enables the attainment of the objects initially set forth herein. It should be understood, however, that the invention is not intended to be limited to the specifics of the illustrated embodiment, but rather as defined by the illustrated embodiment, but rather as defined by the accompanying claims.

What is claimed is:

1. In a glass fiber drawing assembly comprising a bushing having an orifice plate with a generally planar undersurface from which fibers are drawn, a supply nozzle for directing bulk gas against the undersurface of the plate, means for applying a binder to fibers being drawn from the orifice plate, means for collecting the binder applicated fibers together to form at least a strand of glass fibers, and a collet spaced beneath the orifice plate for drawing fibers therefrom, the improvement further comprising a detector for sensing the break-out of fibers being drawn from the orifice plate, said detector including a modulated light source disposed beteen the binder applicating means and the collecting means to direct a beam of light against the fibers being drawn from the orifice plate, and a sensor disposed to sense whether the beam is being intercepted by fibers being drawn from the orifice plate, said sensor being responsive only to the modulated beam of the source.

2. In an assembly according to claim 1, the detector wherein the modulated light source comprises a light emitting diode which emits a beam of high frequency bursts of near infrared energy.

3. In an assembly according to claim 2, the detector wherein the light source and sensor are disposed to the same side of the fiber being drawn and the sensor senses energy from the source which is bounced back from the fiber.

* * * * *